Dec. 24, 1935.　　　H. B. CAMDEN ET AL　　　2,025,337
BARK REMOVING MACHINE
Original Filed June 21, 1934　　6 Sheets-Sheet 1
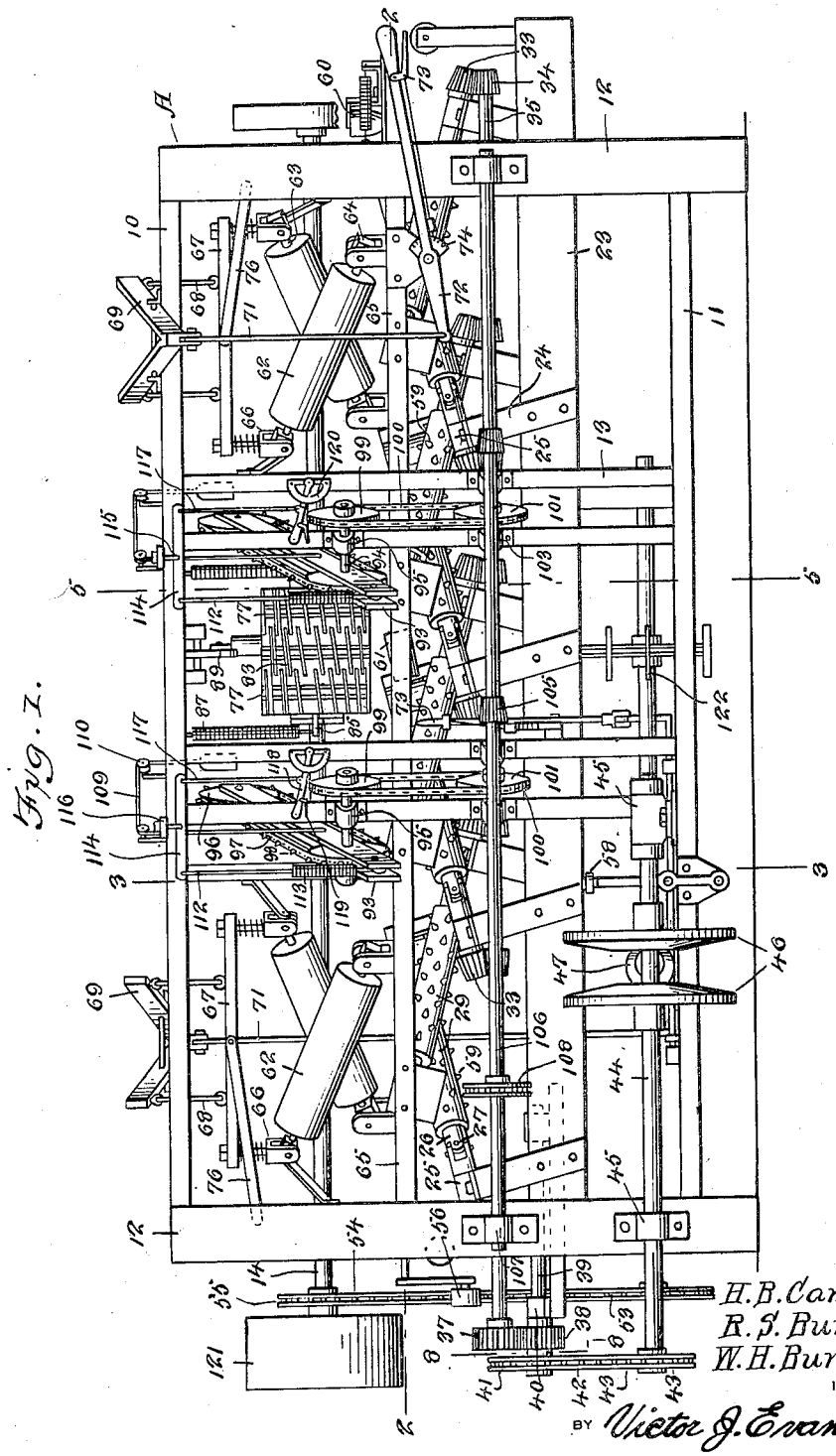
H. B. Camden
R. S. Burruss
W. H. Burruss
INVENTORS
BY Victor J. Evans & Co.
ATTORNEYS.

Dec. 24, 1935.  H. B. CAMDEN ET AL  2,025,337
BARK REMOVING MACHINE
Original Filed June 21, 1934  6 Sheets-Sheet 2
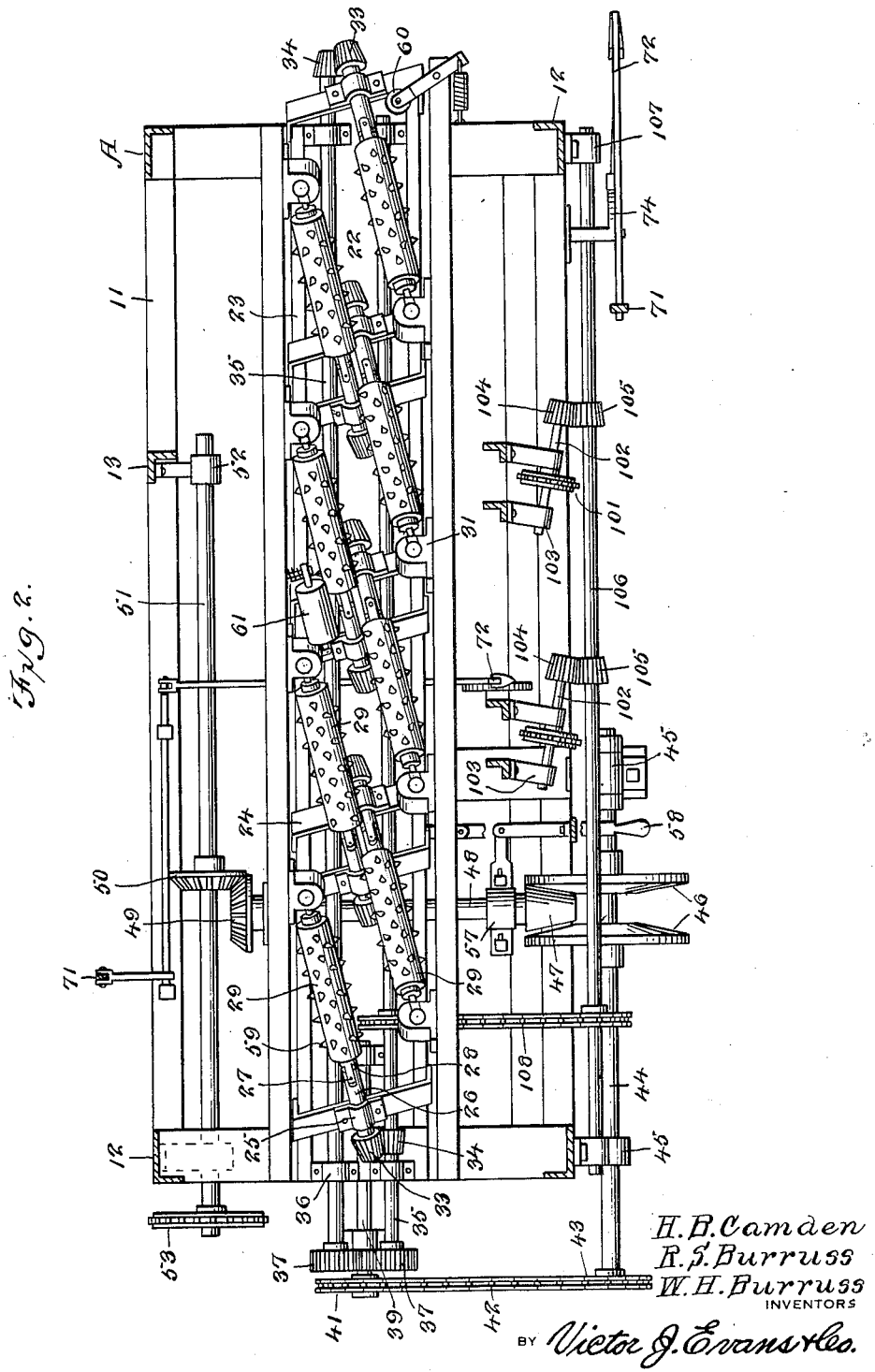
H. B. Camden
R. S. Burruss
W. H. Burruss
INVENTORS
BY Victor J. Evans & Co.
ATTORNEYS Dec. 24, 1935.   H. B. CAMDEN ET AL   2,025,337
BARK REMOVING MACHINE
Original Filed June 21, 1934   6 Sheets-Sheet 3
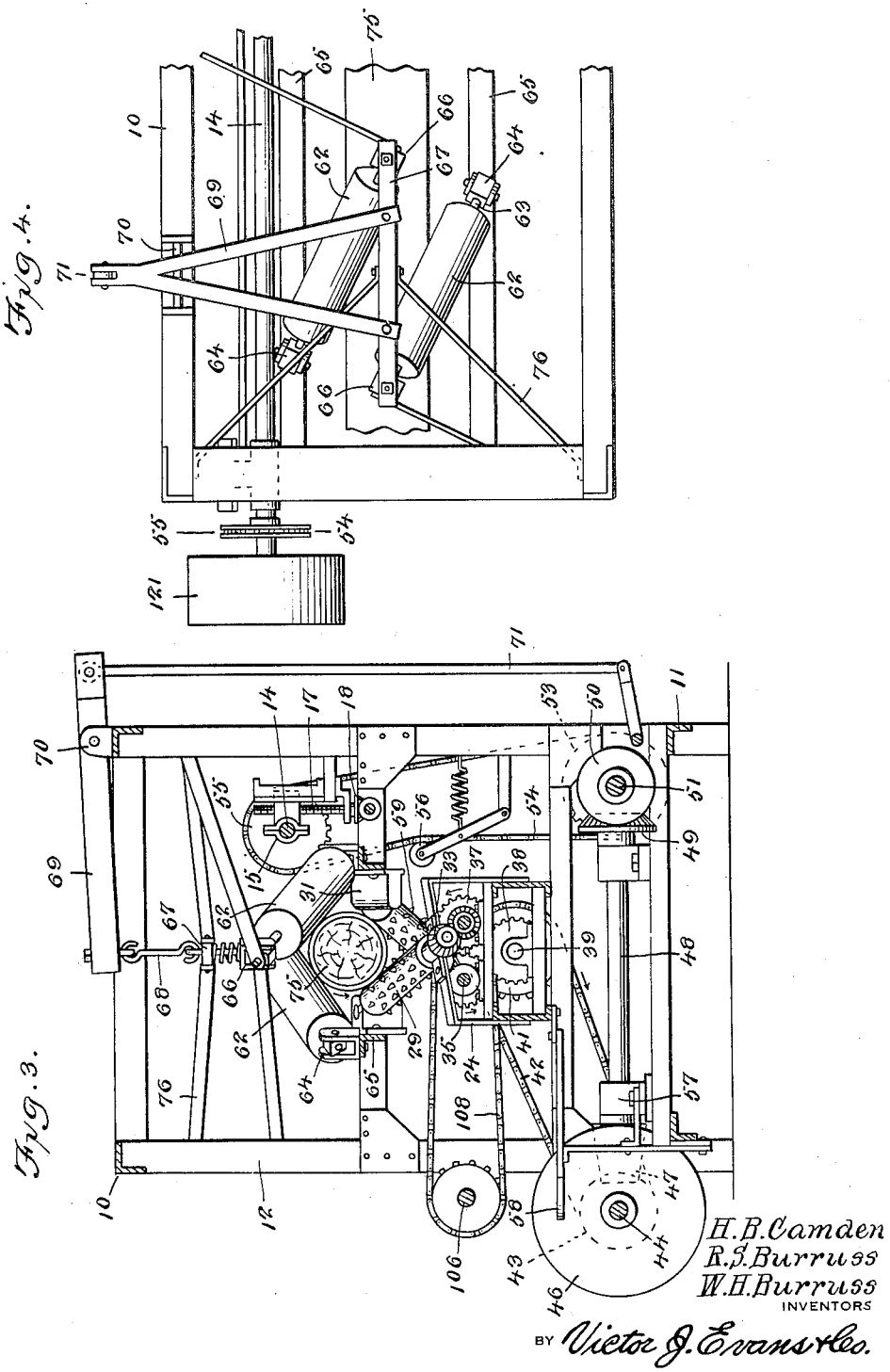
H.B.Camden
R.S.Burruss
W.H.Burruss
INVENTORS
BY Victor J. Evans & Co.
ATTORNEYS

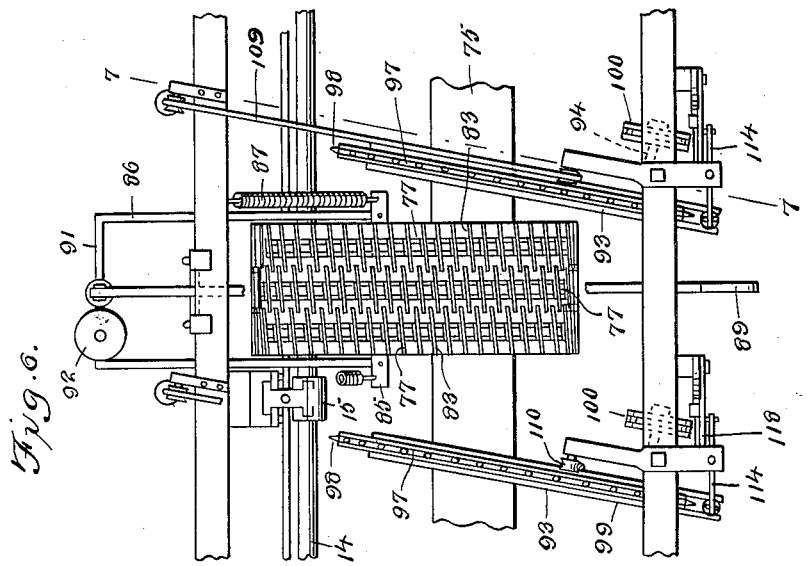
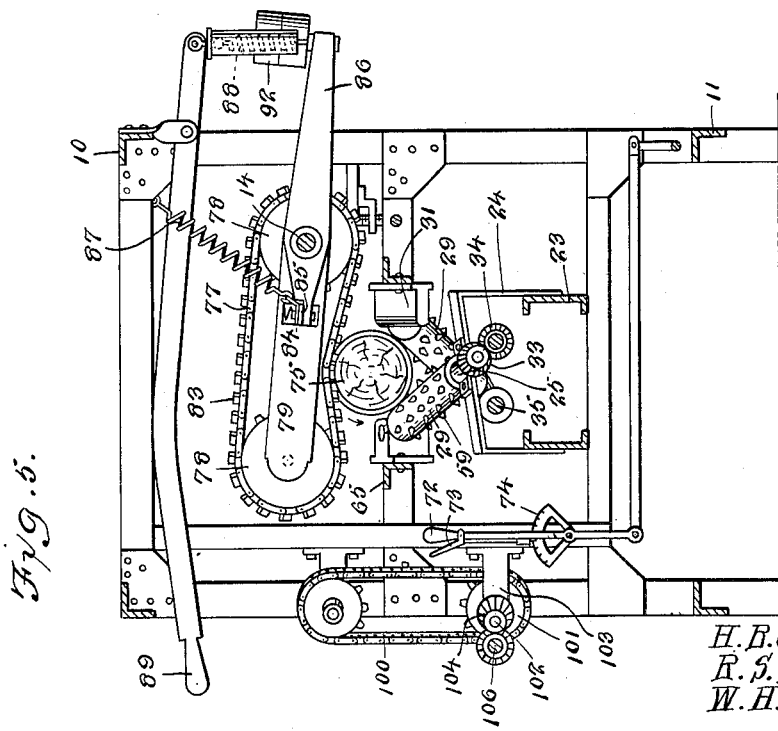

Dec. 24, 1935.    H. B. CAMDEN ET AL    2,025,337
BARK REMOVING MACHINE
Original Filed June 21, 1934    6 Sheets-Sheet 5
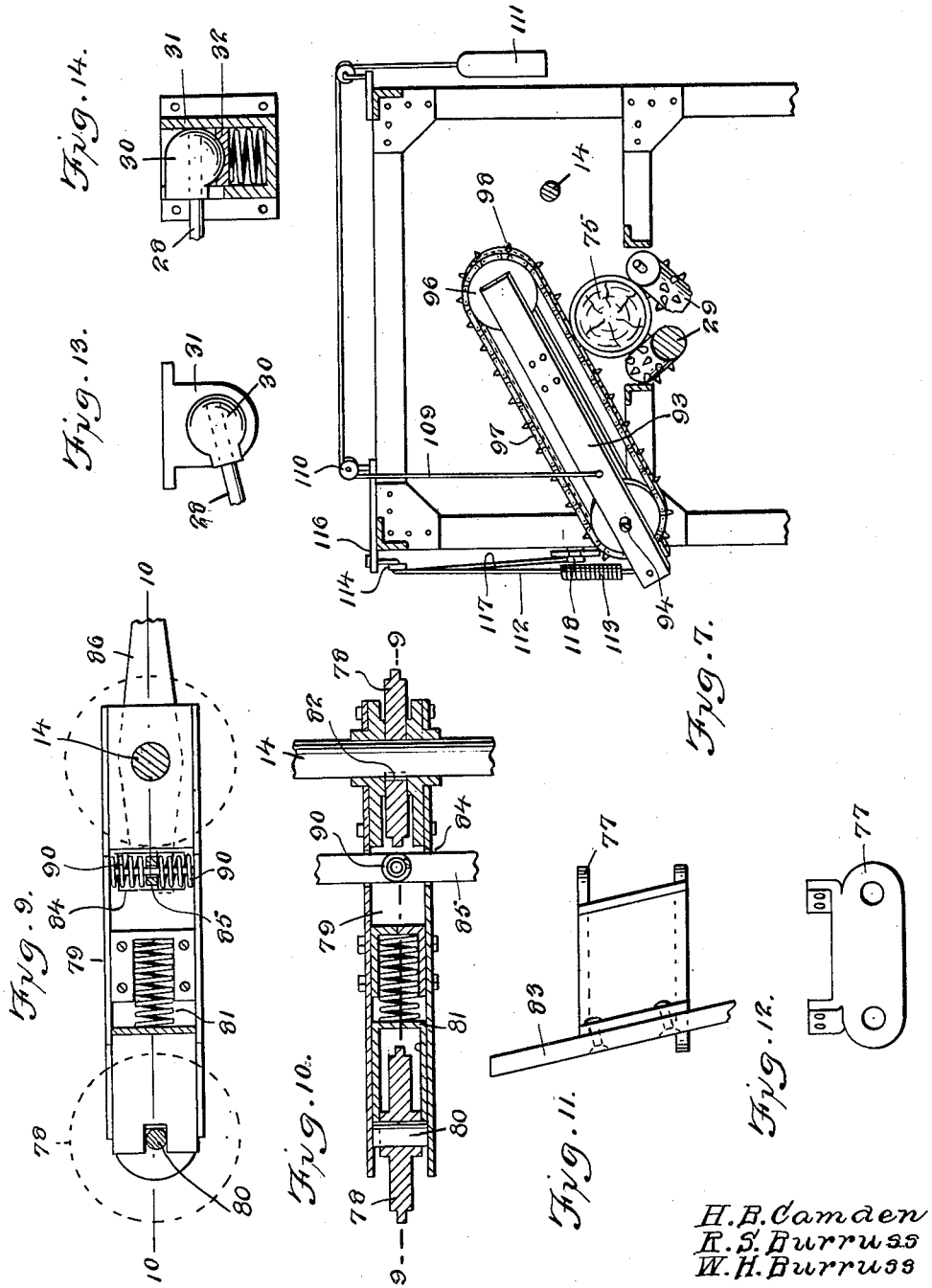

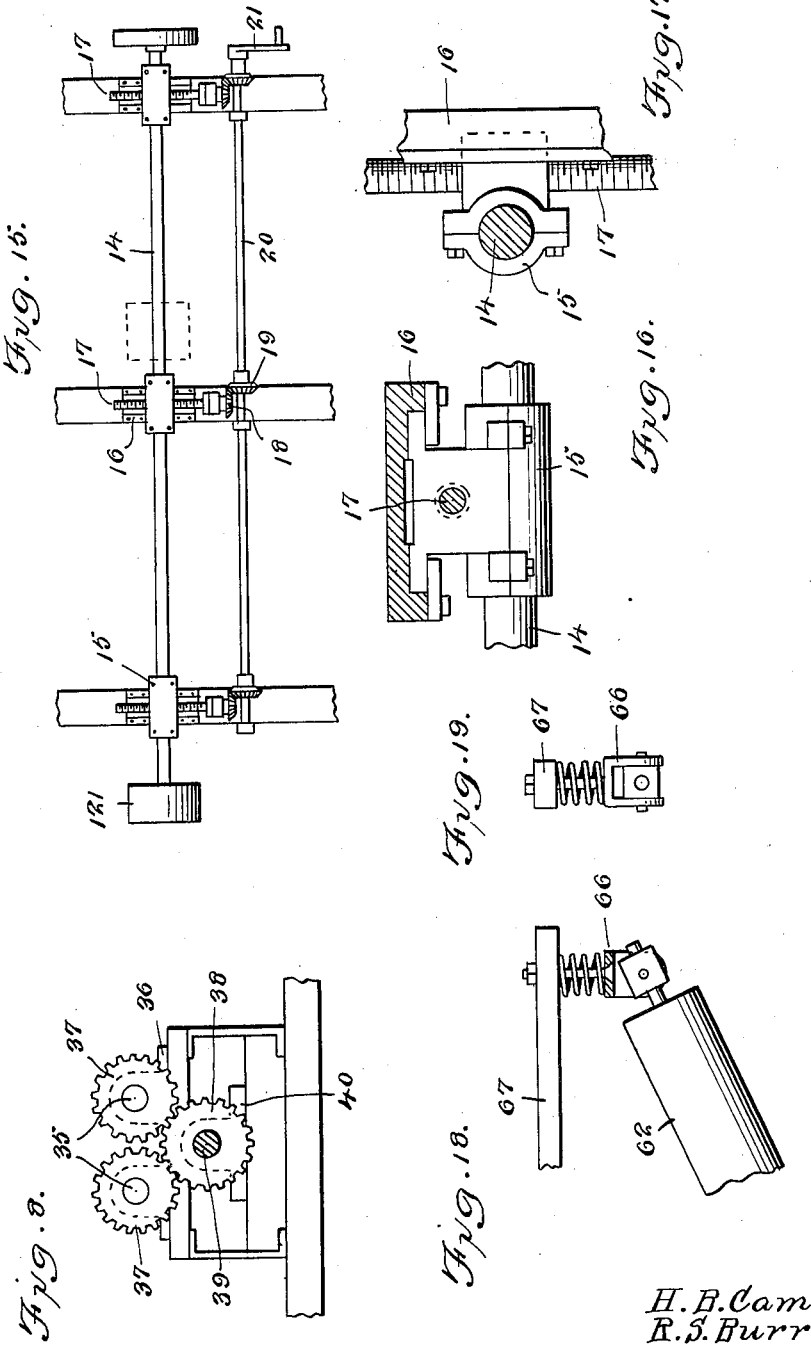

Patented Dec. 24, 1935

2,025,337

UNITED STATES PATENT OFFICE 2,025,337

BARK REMOVING MACHINE

Hugh B. Camden, Richmond, and Robert S. Burruss and William H. Burruss, Lynchburg, Va.

Application June 21, 1934, Serial No. 731,738
Renewed November 4, 1935

2 Claims. (Cl. 144—208)

The invention relates to a machine for removing bark from logs.

The primary object of the invention is the provision of a machine of this character, wherein logs of any length can be fed into the machine and during their passage therethrough the bark upon such logs will be entirely removed, the machine in its operation being automatic so that manual handling of the logs, except by the introduction of the same into the machine, will be entirely eliminated.

Another object of the invention is the provision of a machine of this character, wherein the mechanism thereof for the stripping or removing of bark from logs can be reversed or brought to neutral or passive position, the machine being manually controlled and the parts thereof being novel in construction and in assemblage.

A still further object of the invention is the provision of a machine of this character, wherein the feed rollers for advancing logs through the machine are set in a unique manner so as to positively advance the logs and at the same time give a rotary movement thereto, this movement being retarded so that the bark can be successfully and positively removed from the logs during their travel or passage through the machine.

A still further object of the invention is the provision of a machine of this character which is comparatively simple in construction, thoroughly reliable and efficient in its operation, positive in action, automatic in the working thereof, strong, durable, adjustable for accommodating logs of different cross-sectional diameters, and inexpensive to manufacture and install.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 1 is an elevation of the machine constructed in accordance with the invention.

Figure 2 is a sectional view on the line 2—2 of Figure 1.

Figure 3 is a sectional view on the line 3—3 of Figure 1.

Figure 4 is a fragmentary top plan view.

Figure 5 is a sectional view on the line 5—5 of Figure 1.

Figure 6 is a fragmentary top plan of that portion of the machine shown in Figure 5.

Figure 7 is a fragmentary sectional view on the line 7—7 of Figure 6.

Figure 8 is a sectional view on the line 8—8 of Figure 1.

Figure 9 is a sectional view on the line 9—9 of Figure 10.

Figure 10 is a sectional view on the line 10—10 of Figure 9.

Figure 11 is a fragmentary plan of one of the links and cutters associated therewith of the cutting mechanism.

Figure 12 is a side elevation thereof.

Figure 13 is a detail fragmentary view showing the end mounting of one of the feed rollers.

Figure 14 is a vertical sectional view thereof.

Figure 15 is a fragmentary elevation showing the mode of adjustment of the main power shaft.

Figure 16 is a vertical sectional view through one of the adjustments of said power shaft.

Figure 17 is a side view of Figure 16.

Figure 18 is a fragmentary detail view showing a mounting of one of the guide rollers.

Figure 19 is an end view thereof.

Similar reference characters indicate corresponding parts throughout the several views in the drawings.

Referring to the drawings in detail, the machine in its construction comprises a main frame A involving the upper and lower side sills 10 and 11, respectively, these being joined to corner posts or uprights 12 which in cross section are of L form although they may be otherwise shaped. The frame also has in its build intermediate uprights or posts 13, these being joined with the upper and lower sills 10 and 11 in any desirable manner. At one side of the frame A are arranged suitable bearings for accommodating a main power shaft 14. Preferably the bearings include shaft boxings 15 slidably fitted in guides 16, so that said shaft 14 can be moved vertically for the adjustment thereof. This adjustment is had through the medium of feed screws 17 threaded in the boxings 15 for the shaft 14 and carrying pinions 18 meshing with companion gears 19 on an adjusting shaft 20 suitably journaled in the frame. This shaft, at one end, carries a hand crank 21, so that it can be manually turned for the raising and lowering of the main power shaft 14, as will be clearly obvious from the showing in Figure 15 of the drawings.

At the longitudinal center of the frame A is a way 22 for logs to be operated on for the removal of the bark therefrom, and this way is constituted by the horizontally arranged beams 23, these being spaced laterally from each other uniformly throughout their extent and carrying at intervals the angularly disposed hangers 24 having bearings 25 for driven stud shafts 26, these, through the medium of universal joints 27, being connected with the axles 28 of feed rollers 29, the same being disposed alternately in crossed disposition with respect to each other and diagonally with relation to the way 22. The axles 28 of the rollers 29, at their ends remote from the universal joints 27, each is formed with a ball terminal 30 swingingly fitting in a socketed casing 31 having therein a spring tensioned bearing 32, so that the roller 29 at this ball terminal 30 has a yieldable bearing. The driven stud shafts 26 carry beveled pinions 33, these meshing with companion pinions 34 on supplemental drive shafts 35 having fitting in bearings 36 in the frame A, these shafts being extended lengthwise of the frame A beneath the way 22, and at one end of these shafts are gears 37, these meshing with a gear 38 upon a shaft 39 journalled in bearings 40. The shaft 39 carries a sprocket gear 41 over which is trained an endless sprocket chain 42, the same being also trained over a sprocket gear 43 upon a countershaft 44 journaled in bearings 45. On the shaft 44 are reversing gears 46, these being spaced apart and having arranged therebetween the pinion end 47 of a swinging shaft 48, the latter being disposed transversely of the frame A and carrying the gear 49 meshing with the companion gear 50 upon a shaft 51 journaled, at 52, in said frame. This shaft 51 carries a sprocket gear 53 over which is trained an endless sprocket chain 54, the latter being trained over a sprocket gear 55 upon the power shaft 14, the chain 54 being acted upon by a belt tightener 56, so that when the main power shaft 14 is adjusted, the said tightener 56 will take up the slack in the chain 54, as should be clearly apparent. The shaft 48, through the slide bearing 57 connected with a handle lever 58, can be moved into engagement with either of the reversing gears 46 or to a position neutral therebetween, this being apparent from Figure 2 of the drawings, and in this manner the control of the machine is had.

It will be obvious that power from the main shaft 14 is transmitted to the shafts 35 for the driving of the rollers 29, these being peripherally spurred, at 59, and constituting positive feed rollers for logs when introduced into the way 22 at the right hand end of the frame A, there being a spring tensioned directing roller 60 at the entrance end of the way 22, while midway of the way 22 is another directing roller 61 for the logs in their passage into and through the machine under the feeding action of the rollers 29.

Arranged above the rollers 29 are reversely disposed diagonally arranged and cross related guide rollers 62, their axles 63 at one end being swingingly fitted in bearings 64 on horizontal rails 65 superposed with respect to the beams 23, these rails being made secure in the frame A in any desirable manner. The other ends of the axles 63 of said rollers 62 are pivoted in spring tensioned suspension bearings 66, these being carried by cross pieces 67 suspended through suspension links 68 from rocking yokes 69 swinging upon pivots 70 on the upper sills 10 of the frame A. These yokes 69 are operated from connecting rods 71 pivoted to throw levers 72, each having a hand released latch 73 coacting with a keeper segment 74 fixed with relation to the frame A. Thus it can be seen that on operating the levers 72 the rollers can be pressed against a log 75 advanced through the way 22 by the feed rollers 29 and thus maintain proper engagement of the feed rollers with said log for the advancement of the same and the turning thereof during its passage through the machine. The pieces 67, as well as certain of the bearings 66, are pivoted between members 76 suitably fastened with the frame and which maintain the rollers 62 in proper relation to each other under the rocking action of the yokes 69, this being apparent from Figure 4 of the drawings.

The rollers 62, in their mounting, are arranged at opposite sides of the transverse axis of the frame A, while at this transverse axis and between the said rollers 62 and above the rollers 29 is a bark removing mechanism for the stripping or cutting of the bark from the logs during advancement thereof through the machine within the way 22. The mechanism just referred to comprises endless link chain-like carriers 77, these being arranged in juxtaposition side by side and parallel with each other and disposed crosswise or transversely with respect to the path of travel of the logs in the way 22, they being supported on sprocket gears 78 journaled in the opposite ends of a series of vertically swinging carriages 79, one gear 78 in each carriage 79 having its journal 80 acted upon by a chain tightening device 81 fitted within said carriage, so that the carrier will be rendered taut at all times. These carriages 79 are swingingly supported for vertical movement upon the power shaft 14 and the carriers 77 are driven directly therefrom through one of the gears 78 keyed or splined, at 82, to said shaft 14. The carriers 77 on the respective links thereof, both fore and aft of said links, have secured the diagonally arranged bark removing blades or cutting blades 83, so that these carriers when straddling the log 75 in its passage through the way 22 will be acted upon by said blades for the cutting or stripping of the bark therefrom.

Passed through suitable openings 84 in the side cheeks of the series of carriages 79 is a tensioning bar 85 which, at its ends outside of the series of carriages, is fixed to rockers 86, these being loose upon the shaft 14 for swinging or rocking movement. The rockers 86, at their ends connected with the bar 85, have attached thereto lifter springs 87, the same being attached to a fixed part of the frame A elevated with relation to said rockers. The rockers at the other ends, through a spring connection 88, have attachment to a hand lever 89, the latter being manually controlled to vary the tension of the carriers in the operation of the machine. The tensioning bar 85 within the respective carriages 79 operates against opposed cushioning springs 90, these being suitably fitted within said carriages 79, as is clearly shown in Figures 9 and 10 of the drawings. The rockers 86, at the ends having attached thereto the spring connection 88, are joined by a union web 91. The union web 91 has fitted therewith the counterbalancing weight 92 for the said carriages 79. The action of the carriers 77 upon the log 75 will be clearly apparent in Figure 5 of the drawings.

Arranged at opposite sides of the bark removing or cutting mechanism before described are the inclined diagonally disposed log turning retarders these extending crosswise with relation to the way 22 and each comprising a swinging frame 93 loose upon a stud shaft 94 mounted in the bearing 95. Within the frame 93 are the sprocket gears 96 having trained thereover the endless sprocket chain 97 provided at intervals with spurs 98, these being adapted to bite into the log 75 beneath the retarders, as is clearly shown in Figure 7 of the drawings, one gear 96 being fixed to the stud shaft 94 which also carries the sprocket gear 99 over which is trained the endless sprocket chain 100, the same being also trained over a sprocket gear 101 upon a stud shaft 102 journaled at 103, this shaft 102 being provided with a pinion 104 meshing with a pinion 105 on the shaft 106 journaled at 107 on the frame A, this shaft 106 being driven from shaft 35 through the medium of sprocket and chain connection 108.

Each frame 93 has connected therewith the cable 109 trained over suitable guide pulleys 110 and carrying a counterbalance weight 111, while also connected with the frame 93 is the link 112 including the tensioning spring 113 therewith, the link being also connected to a rocking lever 114, rocking, at 115, on the hanger 116. The lever, through the medium of a link 117, is connected with a throw arm 18 carrying a suitable hand released latch 119 engageable with a stationary keeper segment 120. By manipulating the throw arm 118, the required or desired pressure of each retarder can be had on the log, so that it will be slowed down in its rotary motion under the action of the feed rollers 29 for the successful removal of the bark from said log under the operation of the cutter mechanism.

Each frame 93 is individually controlled by its throw arm 118 and likewise each rocker yoke 69 is controlled by its throw lever 73.

The main power shaft 14 carries a belt pulley 121 for a belt (not shown) operated from any suitable power source.

In the operation of the machine, logs are successively introduced into the machine at the entrance end of the frame A to the way 22, whence the feed rollers 29 will advance the logs 75 through this way and at the same time rotating each. The cutting mechanism will act upon the bark upon the log to strip or cut the same therefrom during the passage of the log through the machine and the rotary motion of the log synchronous with the action of the cutting mechanism is controlled by the retarders hereinbefore described, to avoid fast turning or rotation of the log during the removal of the bark therefrom.

By manual manipulation of the lever 89 the deep or shallow cutting action of the cutting mechanism may be had for the removal of the bark from the log according to the thickness thereof.

Upon the shaft 44 is a suitable means 122 for dispersing the cut or loose bark laterally from within the frame A of the machine to avoid the backing up of this loose bark during the operation of said machine and this means is in the form of a bladed wheel, this being apparent from Figure 1 of the drawings.

What is claimed is:

1. A machine of the character described comprising a main frame having a log way, diagonally disposed and reversely arranged feed rollers supported in said way, guide rollers coacting with the feed rollers, bark removing mechanism arranged crosswise with relation to said way and active upon logs advanced by said feed rollers for removing bark from said logs, mechanism for driving the feed rollers and the said first-named mechanism, means for shifting the guide rollers to increase or decrease the pressure thereof upon the logs, and mechanism at opposite sides of the first-named mechanism for braking the turning of the logs under the action of the feed rollers.

2. A machine of the character described comprising a main frame having a log way, diagonally disposed and reversely arranged feed rollers supported in said way, guide rollers coacting with the feed rollers, bark removing mechanism arranged crosswise with relation to said way and active upon logs advanced by said feed rollers for removing bark from said logs, mechanism for driving the feed rollers and the said first-named mechanism, means for shifting the guide rollers to increase or decrease the pressure thereof upon the logs, mechanism at opposite sides of the first-named mechanism for braking the turning of the logs under the action of the feed rollers, and means for regulating the braking mechanism with relation to the logs.

HUGH B. CAMDEN.
ROBERT S. BURRUSS.
WILLIAM H. BURRUSS.